United States Patent [19]

Bautz

[11] 4,225,023
[45] Sep. 30, 1980

[54] COLLECTOR HEAD FOR TROLLEY CARS
[75] Inventor: Anton Bautz, Crans, Switzerland
[73] Assignee: BBC Brown Boveri & Company Limited, Baden, Switzerland
[21] Appl. No.: 958,547
[22] Filed: Nov. 8, 1978
[30] Foreign Application Priority Data Nov. 10, 1977 [CH] Switzerland .................... 13707/77

[51] Int. Cl.³ ............................................. B60L 5/06
[52] U.S. Cl. ................................ 191/59.1; 191/60.1; 191/60.3
[58] Field of Search ................... 191/59.1, 60.1, 60.3, 191/57

[56] References Cited
U.S. PATENT DOCUMENTS

| | | | |
|---|---|---|---|
| 1,269,037 | 6/1918 | Yirava | 191/60.1 |
| 1,592,333 | 7/1926 | Bower | 191/59.1 |
| 1,893,373 | 1/1933 | Matthes | 191/60.1 |
| 2,481,194 | 9/1949 | Bubb | 191/57 X |
| 2,512,329 | 6/1950 | Heinemann | 191/57 |
| 2,700,705 | 1/1955 | Anjeskey | 191/60.1 X |
| 4,108,288 | 8/1978 | Manabe | 191/59.1 X |
| 4,155,435 | 5/1979 | Kimura | 191/59.1 X |

Primary Examiner—Richard A. Schacher
Attorney, Agent, or Firm—Burns, Doane, Swecker & Mathis

[57] ABSTRACT

A collector head for collecting current from an overhead wire for a trolley car is disclosed having a contact shoe which is pivotable about the longitudinal axis of the overhead wire. The collector head includes a base which is mounted on a shaft extending from the trolley car such that the head is rotatable about the axis of the shaft. The collector head also includes a contact shoe holder for holding the contact shoe. Arms pivotably connect the base to the contact shoe holder in a trapezoidal configuration. The joints at which the arms are connected to the base and to the contact shoe holder have axes of rotation parallel to a longitudinal axis of the contact shoe. A resilient element is disposed between the base and the contact shoe holder. As the contact shoe holder is moved laterally with respect to the overhead wire the contact shoe pivots about the longitudinal axis of the overhead wire, and the lateral forces which tend to unseat the overhead wire from the contact shoe are opposed by a restoring force supplied by the resilient element.

13 Claims, 2 Drawing Figures

COLLECTOR HEAD FOR TROLLEY CARS

BACKGROUND AND SUMMARY OF THE INVENTION

The invention relates generally to collector heads for trolley cars.

The collector head of a current collector for a trolley car is subject to relatively large lateral forces during operation of the trolley car. The large forces, which are the result of the mass moment of inertia of the trolley pole and the trolley head, can reach approximately 130 kps during turns at high speeds. The side walls of the contact shoe, which are in contact with the overhead conductor wire, absorb these considerable forces generated by the movement of the car. Lateral forces are also generated, although of lesser severity, during periods when the car deviates laterally from the axis of the overhead conductor wire.

At turns along the trolley car path, the overhead wires intersect at sharp angles. At such corners, the sharp angles are rounded off by elastic curved rails attached to the wires to reduce the centrifugal forces acting upon the collector head. The curved rails do provide a substantially parabolic path in which the trolley car travels and reduce the magnitude of the centrifugal forces caused by sharp turns in the path. A total elimination of the lateral forces, however, is not possible and rapid increases in these lateral forces are often unavoidable. The collector head when subjected to a sudden change in direction, may lose contact with the overhead wire system during sharp turns or, for example, when the car passes rapidly under branching switches.

Swiss Pat. No. 584,116 discloses a current collector for a trolley bus having a U-shaped collector shoe support disposed at the upper end of a trolley pole. The collector shoe is rotatable about a vertical axis of the pole and is mounted so that it can pivot about a horizontal axis. During operation of the trolley bus, lateral forces are generated as described above. The collector shoe is shifted laterally with respect to the conductor axis so that the overhead conductor wire is forced against a side wall of the U-shaped collector shoe. In this way, the contact pressure between the shoe and the wire is increased, subjecting both to undesirable stresses. Accordingly, a tilting of the collector shoe may occur which tilting may cause the current collector to lose contact with the overhead wire.

It is an object of the present invention to provide a collector head for trolley cars in which the contact pressure with the overhead conductor wire is maintained at a relatively constant value.

It is a further object of the present invention to provide a collector head which prevents the contact shoe from losing contact with the overhead wire.

The present invention accomplishes these and other objects by providing a collector head in which the contact shoe and the collector base are provided with swivel joints and are connected with each other by arms which are fastened to the swivel joints. The axis of rotation of the joints extends parallel to the longitudinal axis of the contact shoe, with the distance between the axes of rotation of the collector base being greater than the distance between the axes of rotation of the contact shoe. This arrangement permits the collector base to swivel without unseating the wire from the contact shoe. At least one elastic element is disposed between the collector base and the contact shoe to damp vibration of the collector head and to restore the shoe to a normal position relative to the wire.

The collector head of the present invention provides a contact shoe which pivots about an axis that is parallel to the longitudinal axis of the contact shoe. The lateral forces, therefore, will act both in a transverse direction with respect to the shoe and downward toward the carbon contact.

The elastic element provides a restoring force for returning the contact shoe to a central position. Additionally, the elastic element also provides a resilient element which can withstand shearing stresses to provide a damping of vibrations. The swivel joints have a hingelike configuration with resilient elements placed between the moving parts of the swivel joints. The specific configuration of the joints allows the transfer of the large lateral forces and facilitates the restoring of the contact shoe to a central position. The trapezoidal placement of the collector base, the arms and the contact shoe provides a particular advantage, in that the contact shoe can pivot about the longitudinal axis of the overhead wire.

BRIEF DESCRIPTION OF THE DRAWINGS

A preferred embodiment of the present invention will be described with reference to the accompanying drawings, wherein like members bear like reference numerals and in which.

DETAILED DESCRIPTION OF THE PREFERRED EMBODIMENT

Figure 2:
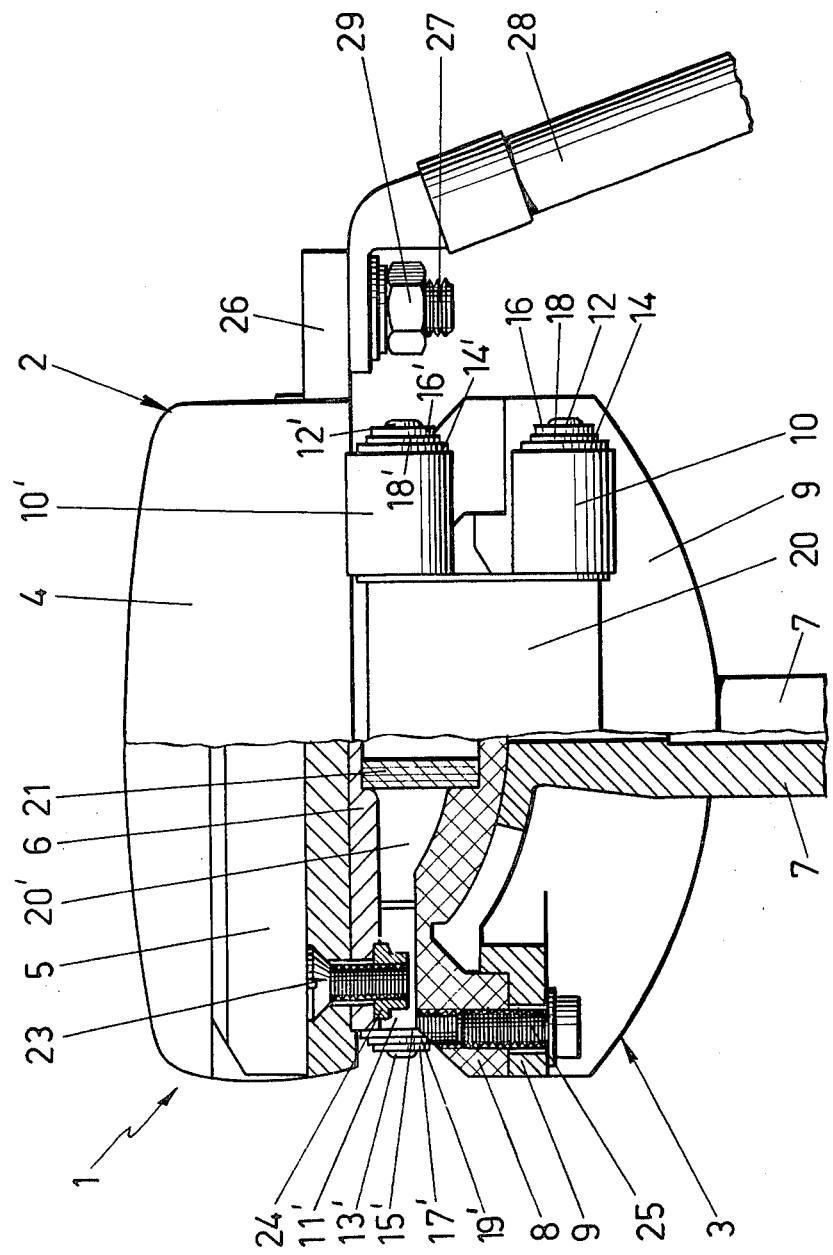

With reference to the drawings, a collector head 1 includes a contact holder 2 and a base 3. The contact holder 2 has a contact shoe 4 in which a carbon contact 5 is disposed. A socket 6 which receives a resilient member is attached to the bottom side of the contact shoe 4, as shown in FIG. 2. The base 3 is rotatably mounted on a vertically-extending shaft 7. A bearing block 8 is seated against the shaft 7, with a support plate 9 being attached to the bearing block 8. At the outer ends of the socket 6 and the support plate 9 are longitudinally-extending bores in which a plurality of bolts 12, 12', 13, 13' are provided.

The bolts 12, 12', 13, 13' are respectively longer than the socket 6 and the support plate 9 in the regions of the longitudinally-extending bores and therefore extend beyond the bores. The bolts are provided with rubber damping elements 14, 14', 15, 15' which are arranged between the bolt heads and the end surface of representative bushings 10, 10', 11, 11'. The bolts 12, 12', 13, 13' are secured both by Seeger or split rings 16, 16', 17, 17' which are fastened near the bolt ends and by washers 18, 18' 19, 19' which are disposed between the rubber damping elements 14, 14', 15, 15' and the split rings.

The contact holder 2 and the base 3 are connected by a pair of rigid arms brackets 20, 20', each of which is respectively fastened to one of the pairs of bolts 12, 12' and 13, 13'. An elastic element 21, preferably made of rubber, is seated between the socket 6 and the bearing surface 8. The elastic element provides a restoring force for the socket 6. An overhead electrical conductor wire 22 rides in a recess of the carbon contact 5 of the socket 6 so as to establish electrical contact between the wire 22 and the collector head 1.

With reference now to FIG. 2, the socket 6 is fastened to the contact shoe 4 by a plurality of bolts 23 which have a countersunk head. The bolts are threaded into the bottom portion of the U-shaped contact holder 4 and are screwed into respective bores 24 which each have an internal thread. The installation of the carbon contact 5 into the contact holder 4 is simplified by reason of the countersunk bolt.

Each bolt 12′, 13′ extends beyond the ends of the respective bushings 10′, 11′ in the contact socket 6 as further illustrated with reference to FIG. 2. The washers 18′, 19′, the split rings 16′, 17′ which secure the bolts 12′ and 13′, and the rubber damping elements 14′, 15′ are coaxially arranged on the bolts 12′, 13′ between the ends of the bushings 10′, 11′ and the ends of the bolts 12′, 13′.

The bearing block 8 and the upper portion of the vertically-extending shaft 7 together form a universal joint. A plurality of bolts 25 attach the support plate 9 to the bottom side of the bearing surface 8, with the support plate 9 having a longitudinal slot through which the shaft 7 extends. As shown in the right hand portion of FIG. 2, the bushing 10, the bolt 12, the rubber damping element 14, the split ring 16 and the washer 18 are all arranged coaxially on the support plate 9 in the same manner as that of the socket 6.

A first arm 20, which receives the bolts 12 and 12′ and a second arm 20′ which receives the bolts 13 and 13′ at the rear of the collector head (as illustrated in FIG. 2) connect the contact holder 2 with the base 3. The elastic element 21, which is preferably made of rubber, is seated between the socket 6 and the bearing block 8 of the base 3.

On one side of the bottom of the U-shaped contact shoe 4 is a connecting terminal 26 which is provided with a threaded bolt 27. A current-carrying cable 28 is attached to the terminal 26 by a nut 29 which is threaded onto the bolt 27.

Figure 1:
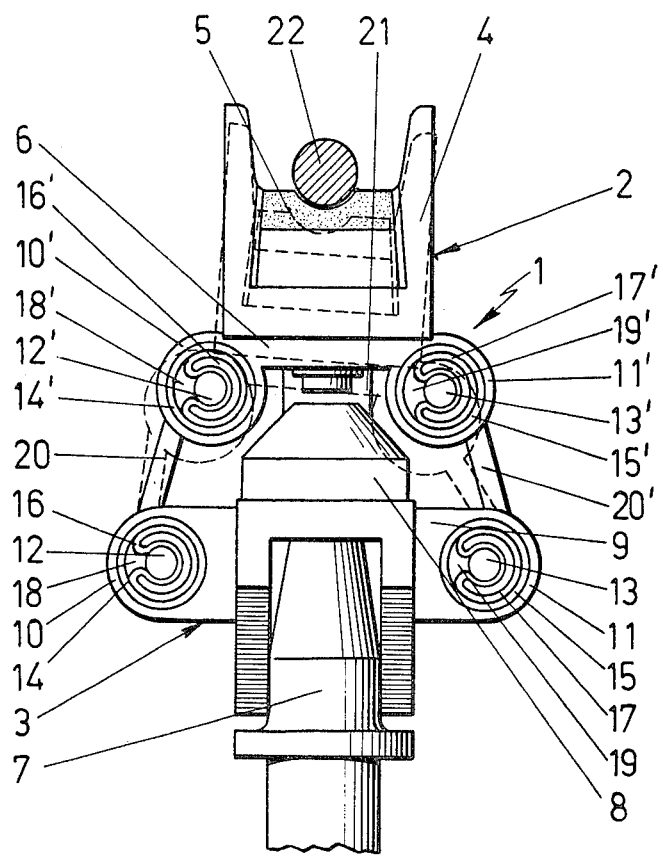
FIG. 1 is a front elevational view of a collector head according to the present invention, with a trapezoidal movement of the contact holder shown in phantom; and, FIG. 2 is a side elevational view, partially in cross-section, of the collector head shown in FIG. 1.

The collector head of the present invention provides a constant contact between the shoe 4 and the conductor 22. When the collector head 1 is subjected to a lateral force, for example, during turning of the trolley car, the contact holder 2 will move laterally (as shown in phantom in FIG. 1) from a central position relative to the base 3. The trapezoidal linkage arrangement of the swivel joints permits the shoe 4 to turn about the axis of the overhead wire at the same time the contact holder 2 moves laterally with respect to the wire. The shoe 4 turns in the same direction that the contact holder 2 moves relative to the base 3. The contact holder 2 therefore will be subjected to a force created by the elastic element 21 which counteracts the force exerted by the overhead wire on the contact. The elastic element 21, which is preferably a rubber part able to withstand the predicted shearing stresses, damps both the turning and the relative lateral movement of the collector head and also provides a restoring force for the return of the collector head to a normal position. The damping elements 14, 14′, 15, 15′ also serve to dampen the motion of the head and counteract bending forces. During operation of the trolley car, the overhead wire 22 remains within the recess in the carbon contact 5 so that the contact pressure with the overhead wire is maintained.

The collector head of the present invention reduces operational stoppages caused by a loss of contact between the overhead wire and the contact shoe due to lateral forces. Furthermore, a steady and uniform contact pressure between the shoe and wire reduces the wear and tear of the contact and the overhead wire system.

The principles, preferred embodiments and modes of operation of the present invention have been described in the foregoing specification. The invention is not to be limited to the particular disclosed forms, which are illustrative and not restrictive examples. Variations and changes may be made by those skilled in the art without departing from the scope and nature of the present invention.

What is claimed is:

1. A collector head for attachment to a shaft extending generally vertically with respect to a trolley car, said collector head comprising:
    a base member including means for pivotably mounting the base member on said shaft with said base member being rotatable about a generally vertical axis;
    a contact holder including means for conducting an electric current; and
    connecting means for pivotably connecting said base member with said contact holder,
    wherein said connecting means includes resilient means for restraining motion of said contact holder relative to said base member, and
    wherein said connecting means further includes at least two rigid arms each pivotably connected both to said base member and to said contact holder, each of said rigid arms being pivotable about a longitudinal axis of the collector head.

2. The collector head according to claim 1 wherein the distance between the rigid arms in said base member is greater than the distance between the rigid arms in said contact holder.

3. The collector head according to claim 1 wherein said rigid arms are each hingedly attached to the base holder and the contact holder by a plurality of bolt members each passing through the base holder and the contact holder and including elastic means for damping motion of the contact holder relative to the base member.

4. The collector head according to claim 1 wherein said resilient means includes a rubber element.

5. A collector head for attachment to a shaft extending generally vertically with respect to a trolley car, said collector head comprising:
    a base member rotatably mounted on the shaft for rotation about a vertical axis;
    a contact holder including a contact surface for conducting an electric current;
    a pair of spaced-apart longitudinally-extending bushings in each of said base member and said contact holder;
    a pair of arms connecting said base member and said contact holder, each of said arms being hingedly attached to the base member and to the contact holder by first and second bolts, each bolt passing through one of the bushings and one of the arms; and
    a resilient element disposed between said base member and said contact holder with lateral motion of said contact holder relative to said base member being opposed by said resilient element.

6. The collector head according to claim 5 wherein the spacing between the pair of bushings in said base member is greater than the spacing between the pair of bushings in said contact holder.

7. The collector head according to claim 5 including elastic elements disposed between a head of each of said bolts and an end of each of said bushings for damping said lateral movement of said contact holder.

8. The collector head according to claim 5 wherein said resilient element is of rubber.

9. The collector head according to claim 6 wherein said pair of bushings in each of the base member and the contact holder together provide a trapezoidal linkage for the collector head.

10. A collector head for collecting current from an overhead wire for a trolley car, said collector head being attached to a shaft extending generally vertically from said trolley car such that said head is pivotable about the vertical axis of said shaft, said collector head comprising:
   a base member having first and second swivel joint bushings;
   a contact holder having a longitudinal axis and third and fourth swivel joint bushings, said contact holder including means for electrical contact with said overhead wire;
   means for pivotably connecting said base member to said contact holder including a first arm pivotably connected both to said first and said third swivel joint bushings so as to form first and third swivel joints having first and third axes of rotation, respectively, and a second arm pivotably connected both to said second and said fourth swivel joint bushings so as to form second and fourth swivel joints having second and fourth axes of rotation, respectively; and
   resilient means disposed between said base member and said contact holder for restraining lateral motion of said contact holder relative to said base member;
   wherein the axis of rotation of each of the swivel joints is parallel to the longitudinal axis of said contact holder; and
   wherein the distance between said first and second axes of rotation is greater than the distance between said third and fourth axes of rotation; and
   whereby said electrical contact means is pivotable about the longitudinal axis of said overhead wire.

11. The collector head according to claim 10 wherein the resilient means includes a rubber element.

12. The collector head according to claim 10 wherein said first rigid arm is hingedly attached to said first and third swivel joint bushings by first and third bolts, respectively, and said second rigid arm is hingedly attached to said second and fourth swivel joint bushings by second and fourth bolts, respectively.

13. The collector head according to claim 12 wherein rubber elements are disposed between a head of each of said bolts and an end of each of said bushings for damping said lateral motion of said contact holder.

* * * * *